United States Patent
Uziel et al.

(10) Patent No.: US 12,063,687 B2
(45) Date of Patent: Aug. 13, 2024

(54) CELLULAR VEHICLE-TO-EVERYTHING ALLOCATION COLLISION DETECTION

(71) Applicant: QUALCOMM Incorporated, San Diego, CA (US)

(72) Inventors: Lior Uziel, Hod Hasharon (IL); Michael Levitsky, Rehovot (IL); Gideon Kutz, Ramat Hasharon (IL); Assaf Touboul, Netanya (IL); Shay Landis, Hod Hasharon (IL); Cheol Hee Park, San Diego, CA (US); Ralph Akram Gholmieh, San Diego, CA (US); Chu-Hsiang Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 17/103,837

(22) Filed: Nov. 24, 2020

(65) Prior Publication Data

US 2022/0167415 A1    May 26, 2022

(51) Int. Cl.
*H04W 74/0808*   (2024.01)
*H04L 1/1812*   (2023.01)
*H04W 4/40*   (2018.01)

(52) U.S. Cl.
CPC ....... *H04W 74/0825* (2013.01); *H04L 1/1812* (2013.01); *H04W 4/40* (2018.02)

(58) Field of Classification Search
None
See application file for complete search history.

(56) References Cited

U.S. PATENT DOCUMENTS

| 2020/0029318 A1 | 1/2020 | Guo | |
| 2021/0028891 A1* | 1/2021 | Zhou | H04W 4/40 |
| 2021/0250913 A1* | 8/2021 | Ganesan | H04W 28/26 |

(Continued)

FOREIGN PATENT DOCUMENTS

| WO | 2020092939 A1 | 5/2020 | |
| WO | WO-2020192655 A1 * | 10/2020 | H04L 1/1812 |

OTHER PUBLICATIONS

Huawei, et al., "Remaining Details of Sidelink Resource Allocation Mode 1", 3GPP TSG RAN WG1 Meeting #101-e, R1-2003494, 3rd Generation Partnership Project (3GPP), e-meeting, May 25, 2020-Jun. 5, 2020, 17 Pages, Retrieved from the Internet: URL: https://ftp.3gpp.org/tsg_ran/WG1_RL1/TSGR1_101-e/Docs/R1-2003494.zip R1-2003494.docx, [Retrieved on May 16, 2020].

(Continued)

*Primary Examiner* — Kenny S Lin
*Assistant Examiner* — Rodrick Mak
(74) *Attorney, Agent, or Firm* — Seyfarth Shaw LLP

(57) ABSTRACT

A method includes cellular vehicle-to-everything (CV2X) allocation collision detection and reporting. An allocation collision detection module detects control channel allocations from transmitting user equipments (UEs) in each time period of a group of time periods. A quantity of detected control channel allocations is determined in each time period. A report is then built and transmitted to at least one of the transmitting UEs. The report indicates collisions in each time period, based on the quantity and a location of the detected control channels in each time period, as well as based on a type of UE interface.

18 Claims, 11 Drawing Sheets

(56) References Cited

U.S. PATENT DOCUMENTS

| | | | | |
|---|---|---|---|---|
| 2021/0259019 A1* | 8/2021 | Hassan | ............ | H04W 74/0825 |
| 2021/0314750 A1* | 10/2021 | Nguyen | ................ | H04W 72/20 |
| 2022/0046595 A1* | 2/2022 | Yu | ........................ | H04W 80/02 |
| 2022/0200766 A1* | 6/2022 | Khoryaev | ............. | H04L 5/0055 |
| 2023/0131882 A1* | 4/2023 | Lin | .................... | H04W 72/566 |
| | | | | 370/329 |

OTHER PUBLICATIONS

International Search Report and Written Opinion—PCT/US2021/060171—ISA/EPO—Mar. 16, 2022.
ITRI: "Discussion on Enhancement for NR V2X Mode 2", 3GPPTSG RAN WG1 #103-e, R1-2007878, 3rd Generation Partnership Project (3GPP), e-Meeting, Oct. 26, 2020-Nov. 13, 2020, 5 Pages, Retrieved from the Internet: URL: https://ftp.3gpp.org/tsg_ran/WG1_RL1/TSGR1_103-e/Docs/R1-2007878.zip R1-2007878.docx, [Retrieved on Oct. 20, 2020].

* cited by examiner

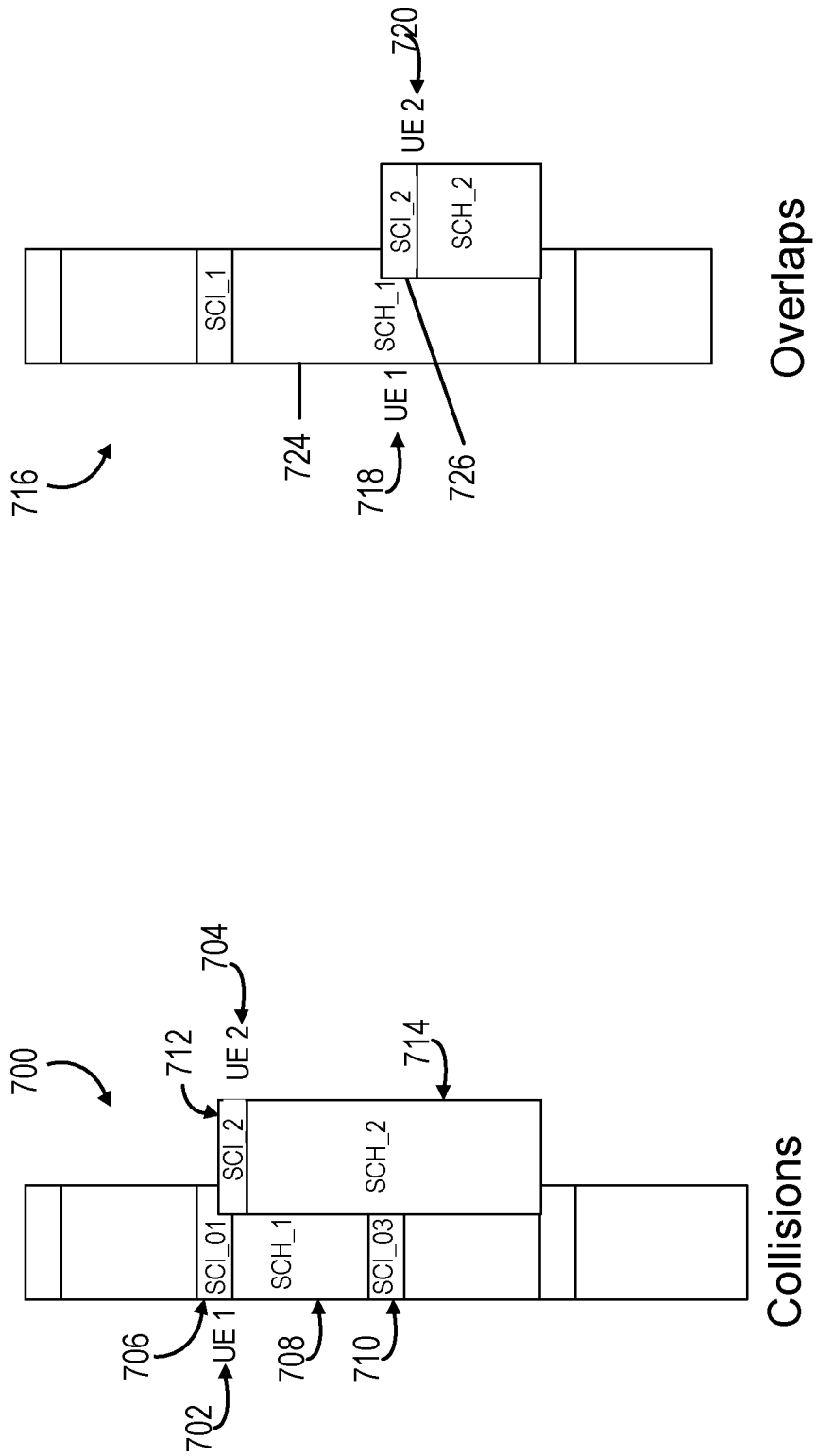

CELLULAR VEHICLE-TO-EVERYTHING ALLOCATION COLLISION DETECTION

FIELD OF THE DISCLOSURE

Aspects of the present disclosure generally relate to wireless communications, and more particularly to techniques and apparatuses for cellular vehicle-to-everything (CV2X) allocation collision detection.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communications systems may include or provide support for various types of communications systems, such as vehicle related cellular communications systems (e.g., cellular vehicle-to-everything (CV2X) communications systems). Vehicle related communications systems may be used by vehicles to increase safety and to help prevent collisions of vehicles. Information regarding inclement weather, nearby accidents, road conditions, and/or other information may be conveyed to a driver via the vehicle related communications system. In some cases, sidelink user equipments (UEs), such as vehicles, may communicate directly with each other using device-to-device (D2D) communications over a D2D wireless link. These communications can be referred to as sidelink communications.

As the demands for sidelink communications increase, different CV2X communications systems compete for the same wireless communications resources. In addition, as the number of cars supporting CV2X communication grows rapidly, the CV2X network is expected to become increasingly crowded, especially for peak traffic scenarios. As a result, the chance of colliding allocations between UEs may increase. An allocation collision may prevent successful decoding of at least one of the colliding UE transmissions and in some cases may prevent all of the colliding UE transmissions from being decoded. Moreover, some sidelink UEs may be power limited. Accordingly, there is a need for cellular vehicle-to-everything (CV2X) transmission-based collision and overlap detection.

SUMMARY

Aspects of the disclosure provide a method of wireless communication by a sidelink user equipment (UE). The method begins with detecting control channel allocations from transmitting UEs in each time period of a group of time periods. Next, the method determines a quantity of detected control channel allocations in each time period. Then, the UE reports, to at least one of the transmitting UEs, collisions in each time period, based on the quantity and a location of detected control channels in each time period, and also on a type of UE interface.

A further aspect of the disclosure provides a method of wireless communication for a sidelink transmitting user equipment. The method includes receiving a report, from a reporting UE. The report includes collision information and virtual collision information for multiple periods, based on a quantity and a location of control channels detected by the receiving UE in each time period. Based on the report, a UE may reselect transmission resources.

A still further aspect of the disclosure provides an apparatus for wireless communication by a sidelink user equipment (UE). The apparatus includes a collision detection module configured to communicate with a UE, an infrastructure element, and a network. The apparatus further includes a memory and at least one processor coupled to the memory and configured to detect control channels from transmitting UEs in each time period of a group of time periods. The process is also configured to determine a quantity of detected control channels in each time period and to report, to at least one of the transmitting UEs, collisions in each time period, based on the quantity and location of the detected control channels in each time period, and also on a type of UE interface.

A further aspect of the disclosure provides an apparatus for wireless communication, by a sidelink user equipment (UE). The apparatus includes a memory and at least one processor coupled to the memory. The processor(s) is configured to detect control channel allocations from transmitting UEs in each time period of a group of time periods. The processor(s) is further configured to determine a quantity of detected control channel allocations in each time period and to report, to at least one of the transmitting UE, collisions in each time period, based on a type of UE interface.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims.

Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7A is a diagram illustrating a collision in a cellular vehicle-to-everything (CV2X) system, in accordance with aspects of the disclosure.

FIG. 7B is a diagram illustrating an overlap in a cellular vehicle-to-everything (CV2X) system, in accordance with aspects of the disclosure.

DETAILED DESCRIPTION

Figure 1:
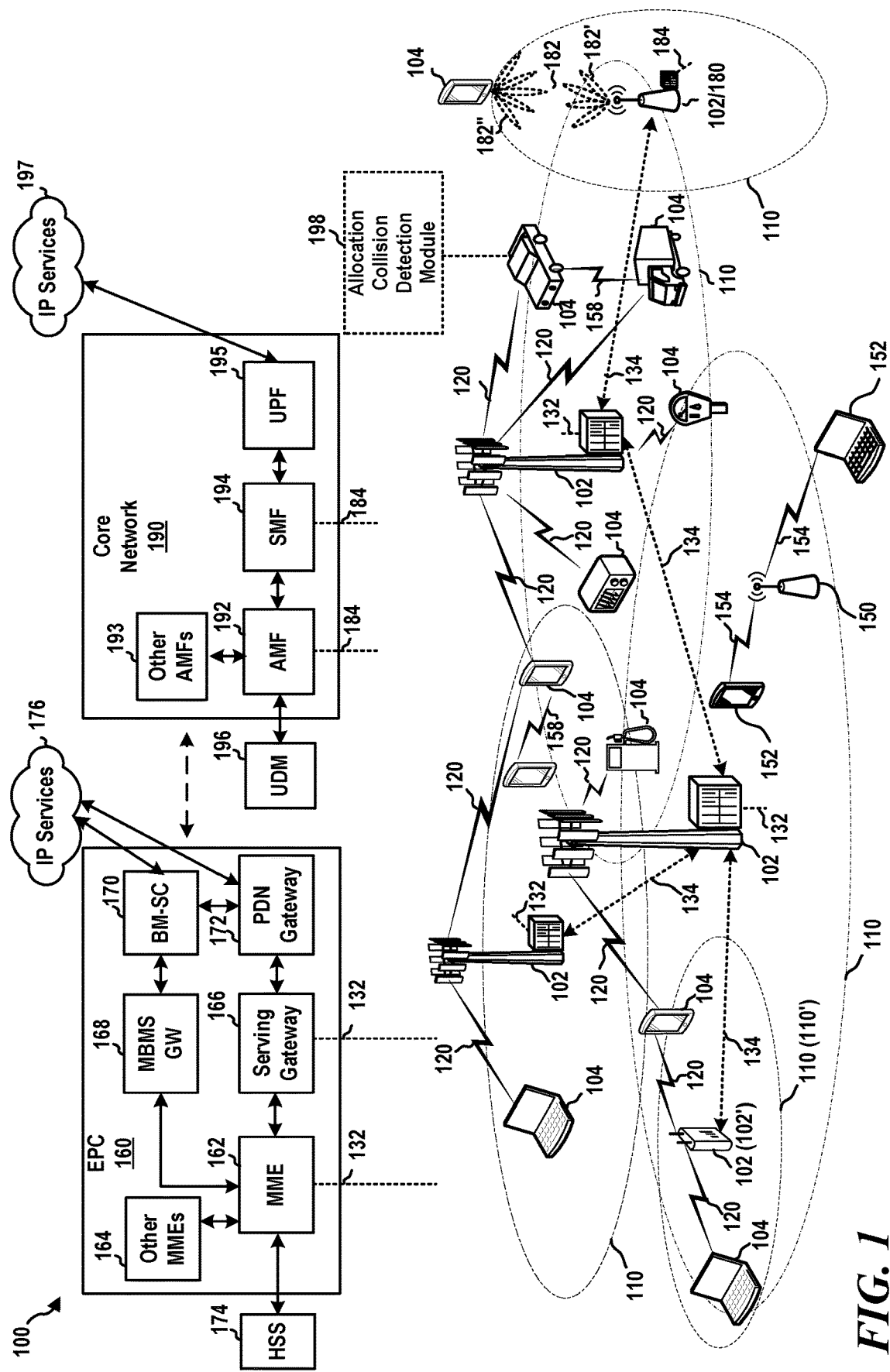
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may generally communicate with each other via one or more network entities such as a base station or scheduling entity. Some networks may support device-to-device (D2D) communications that enable discovery of, and communications with nearby devices using a direct link between devices (e.g., without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications can avoid the overhead involving the routing to and from the base station. Therefore, D2D communications can improve throughput, reduce latency, and/or increase energy efficiency.

A type of D2D communications may include vehicle-to-everything (V2X) communications. V2X communications may assist autonomous vehicles in communicating with each other. For example, autonomous vehicles may include multiple sensors (e.g., light detection and ranging (LiDAR), radar, cameras, etc.). In most cases, the autonomous vehicle's sensors are line of sight sensors. In contrast, V2X communications may allow autonomous vehicles to communicate with each other for non-line of sight situations.

Sidelink (SL) communications refers to the communications among user equipment (UE) without tunneling through a base station (BS) and/or a core network. Sidelink communications can be communicated over a physical sidelink control channel (PSCCH) and a physical sidelink shared channel (PSSCH). The PSCCH and PSSCH are similar to a physical downlink control channel (PDCCH) and a physical downlink shared channel (PDSCH) in downlink (DL) communications between a BS and a UE. For instance, the PSCCH may carry sidelink control information (SCI) and the PSCCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communications may include, among others, vehicle-to-everything (V2X), industrial IoT (IIoT), and/or NR-lite.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mmWave radio frequency band (e.g., 3 GHz-300 GHz) has extremely high path loss and a short range. The mmWave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a receiving device, such as the UE 104, may include an allocation collision detection module 198 configured to detect collisions and overlaps for UEs, such as the UE 104, in sidelink transmissions.

Although the following description may be focused on 5GNR, it may be applicable to other similar areas, such as LTE, LTE-A, CDMA, GSM, and other wireless technologies.

Figure 2:
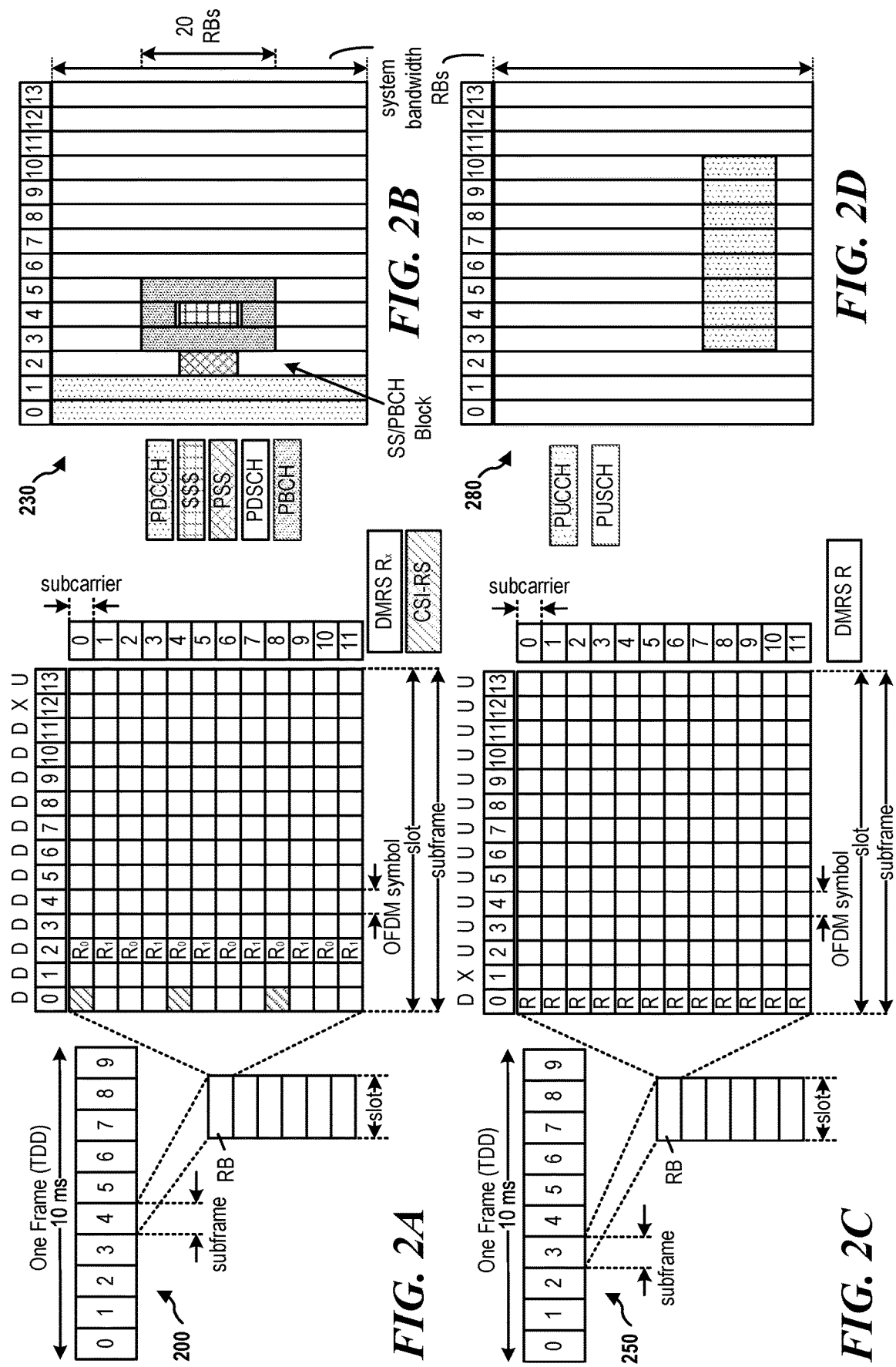
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu * 15$ kHz, where p is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
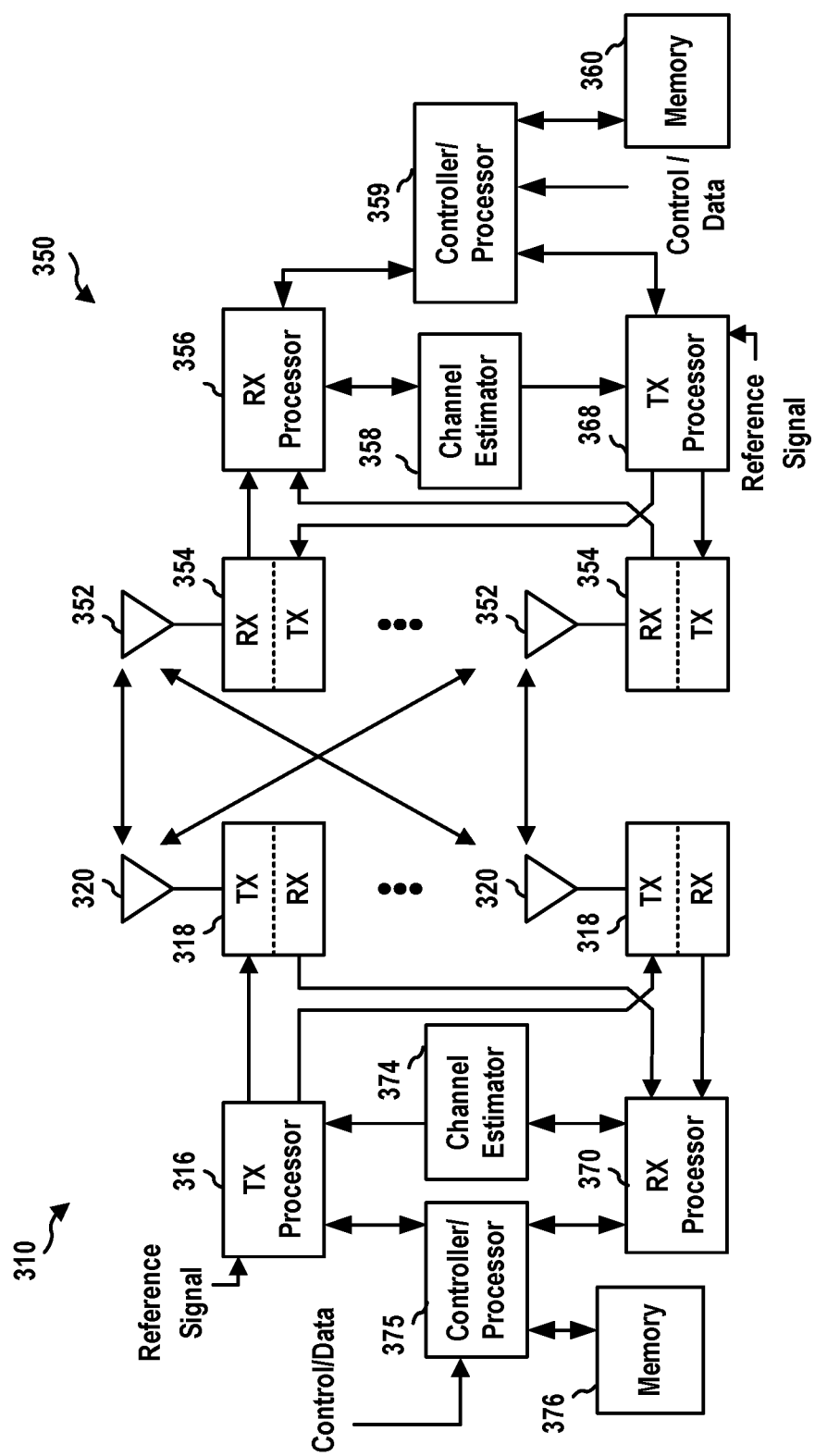
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the allocation collision detection module 198 of FIG. 1.

Figure 4A:
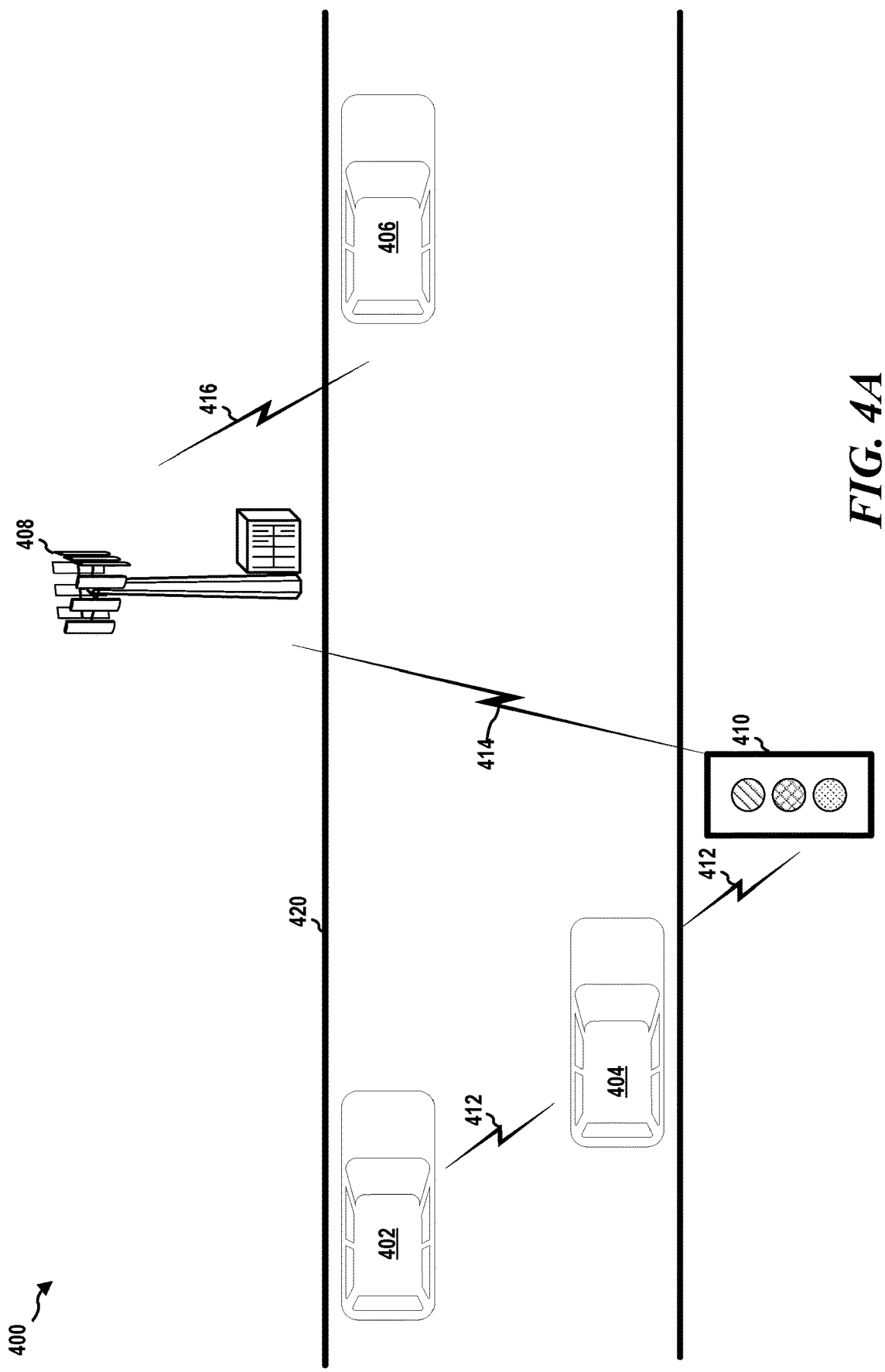
FIG. 4A is a block diagram illustrating an example of a vehicle-to-everything (V2X) system with a road side unit (RSU), according to aspects of the present disclosure.

FIG. 4A illustrates an example of a vehicle-to-everything (V2X) system 500 with a road side unit (RSU), according to aspects of the present disclosure. As shown in FIG. 4A, a V2X system 400 includes a transmitter UE 404 transmits data to an RSU 410 and a receiving UE 402 via sidelink transmissions 412. Additionally, or alternatively, the RSU 410 may transmit data to the transmitter UE 404 via a sidelink transmission 412. The RSU 410 may forward data received from the transmitter UE 404 to a cellular network (e.g., gNB) 408 via an UL transmission 414. The gNB 408 may transmit the data received from the RSU 410 to other UEs 406 via a DL transmission 416. The RSU 410 may be incorporated with traffic infrastructure (e.g., traffic light, light pole, etc.) For example, as shown in FIG. 4A, the RSU 410 is a traffic signal positioned at a side of a road 420. Additionally or alternatively, RSUs 410 may be stand-alone units.

Figure 4B:
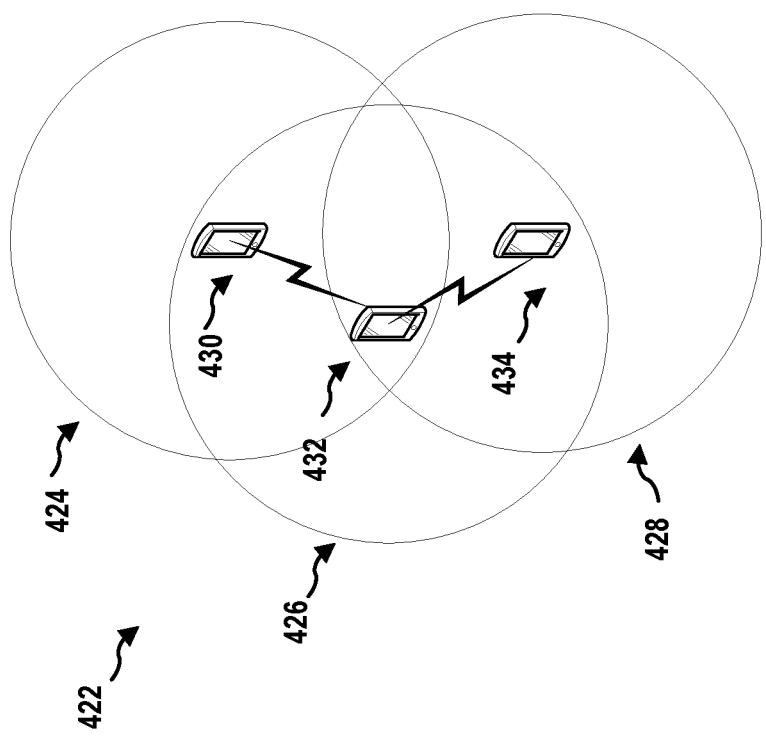
FIG. 4B is a block diagram illustrating an example of a vehicle-to-everything (V2X) system with a hidden user equipment (UE), according to aspects of the present disclosure.

FIG. 4B is a block diagram illustrating an example of a vehicle-to-everything (V2X) system with a hidden user equipment (UE), according to aspects of the present disclosure. In FIG. 4B a hidden UE scenario 422 is shown. A UE 1 430 has a first coverage area 424. A second UE 2 432 has a second coverage area 426 and a third UE 3 434 has a third coverage area 428. As shown in FIG. 4B UE 1 430 and UE 3 434 may be hidden from one another and may not be aware of the respective transmit allocations. These hidden UEs may unknowingly select the same transmit resources, resulting in an allocation collision.

Figure 5:
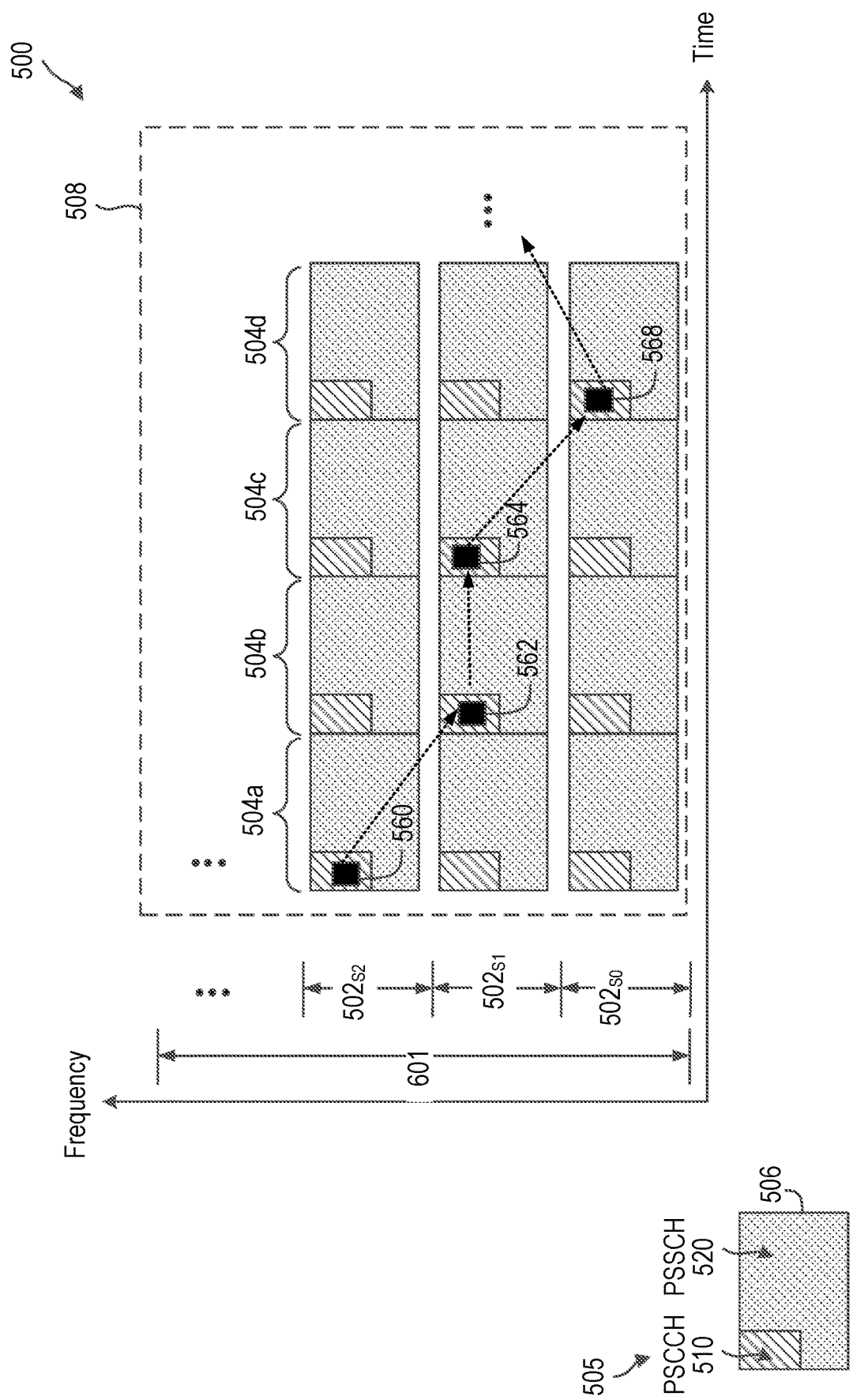
FIG. 5 is a graph illustrating a sidelink (SL) communications scheme, in accordance with various aspects of the present disclosure.

FIG. 5 is a graph illustrating a sidelink (SL) communications scheme in accordance with various aspects of the present disclosure. The scheme 500 may be employed by UEs such as the UEs 104 in a network such as the network 100. In FIG. 5, the x-axis represents time and the y-axis represents frequency.

In the scheme 500, a shared radio frequency band 501 is partitioned into multiple subchannels or frequency subbands 502 (shown as $502_{S0}$, $502_{S1}$, $502_{S2}$) in frequency and multiple sidelink frames 504 (shown as 504a, 504b, 504c, 504d) in time for sidelink communications. The frequency band 501 may be at any suitable frequencies. The frequency band 501 may have any suitable bandwidth (BW) and may be partitioned into any suitable number of frequency subbands 502. The number of frequency subbands 502 can be dependent on the sidelink communications BW requirement.

Each sidelink frame 504 includes a sidelink resource 506 in each frequency subband 502. A legend 505 indicates the types of sidelink channels within a sidelink resource 506. In some instances, a frequency gap or guard band may be specified between adjacent frequency subbands 502, for example, to mitigate adjacent band interference. The sidelink resource 506 may have a substantially similar structure as an NR sidelink resource. For instance, the sidelink resource 506 may include a number of subcarriers or RBs in frequency and a number of symbols in time. In some instances, the sidelink resource 506 may have a duration between about one millisecond (ms) to about 20 ms. Each sidelink resource 506 may include a PSCCH 510 and a PSSCH 520. The PSCCH 510 and the PSSCH 520 can be multiplexed in time and/or frequency. In the example of FIG. 5, for each sidelink resource 506, the PSCCH 510 is located during the beginning symbol(s) of the sidelink resource 506 and occupies a portion of a corresponding frequency subband 502, and the PSSCH 520 occupies the remaining time-frequency resources in the sidelink resource 506. In some instances, a sidelink resource 506 may also include a physical sidelink feedback channel (PSFCH), for example, located during the ending symbol(s) of the sidelink resource 506. In general, a PSCCH 510, a PSSCH 520, and/or a PSFCH may be multiplexed within a sidelink resource 506.

The PSCCH 510 may carry SCI 560 and/or sidelink data. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IIoT data (e.g., sensor measurements, device measurements, temperature readings, etc.). The PSFCH can be used for carrying feedback information, for example, HARQ ACK/NACK for sidelink data received in an earlier sidelink resource 506.

In an NR sidelink frame structure, the sidelink frames 504 in a resource pool 508 may be contiguous in time. A sidelink UE (e.g., the UEs 104) may include, in SCI 560, a reservation for a sidelink resource 506 in a later sidelink frame 504. Thus, another sidelink UE (e.g., a UE in the same NR-U sidelink system) may perform SCI sensing in the resource pool 508 to determine whether a sidelink resource 506 is available or occupied. For instance, if the sidelink UE detected SCI indicating a reservation for a sidelink resource 506, the sidelink UE may refrain from transmitting in the reserved sidelink resource 506. If the sidelink UE determines that there is no reservation detected for a sidelink resource 506, the sidelink UE may transmit in the sidelink resource 506. As such, SCI sensing can assist a UE in identifying a target frequency subband 502 to reserve for sidelink communications and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 502 in one sidelink frame 504 to another frequency subband 502 in another sidelink frame 504. In the illustrated example of FIG. 5, during the sidelink frame 504a, the sidelink UE transmits SCI 560 in the sidelink resource 506 located in the frequency subband $502_{S2}$ to reserve a sidelink resource 506 in a next sidelink frame 504b located at the frequency subband $502_{S1}$. Similarly, during the sidelink frame 504b, the sidelink UE transmits SCI 562 in the sidelink resource 506 located in the frequency subband $502_{S1}$ to reserve a sidelink resource 506 in a next sidelink frame 504c located at the frequency subband $502_{S1}$. During the sidelink frame 504c, the sidelink UE transmits SCI 564 in the sidelink resource 506 located in the frequency subband $502_{S1}$ to reserve a sidelink resource 506 in a next sidelink frame 504d located at the frequency subband $502_{S0}$. During the sidelink frame 504d, the sidelink UE transmits SCI 568 in the sidelink resource 506 located in the frequency subband $502_{S0}$. The SCI 568 may reserve a sidelink resource 506 in a later sidelink frame 504.

The SCI can also indicate scheduling information and/or a destination identifier (ID) identifying a target receiving sidelink UE for the next sidelink resource 506. Thus, a sidelink UE may monitor SCI transmitted by other sidelink UEs. Upon detecting SCI in a sidelink resource 506, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 504 in different frequency subband (e.g., via frequency division multiplexing (FDM)). For instance, in the sidelink frame 504b, one pair of sidelink UEs may communicate sidelink data using a sidelink resource 506 in the frequency subband $502_{S2}$ while another pair of sidelink UEs may communicate sidelink data using a sidelink resource 506 in the frequency subband $502_{S1}$.

In some aspects, the scheme 500 is used for synchronous sidelink communications. That is, the sidelink UEs may be synchronized in time and are aligned in terms of symbol boundary, sidelink resource boundary (e.g., the starting time of sidelink frames 504). The sidelink UEs may perform synchronization in a variety of forms, for example, based on sidelink SSBs received from a sidelink UE and/or NR-U SSBs received from a BS (e.g., the BSs 105 and/or 205) while in-coverage of the BS. In some aspects, the sidelink UE may be preconfigured with the resource pool 508 in the frequency band 501, for example, while in coverage of a serving BS. The resource pool 508 may include a plurality of sidelink resources 506. The BS can configure the sidelink UE with a resource pool configuration indicating resources in the frequency band 501 and/or the subbands 502 and/or timing information associated with the sidelink frames 504. In some aspects, the scheme 500 includes mode-2 RRA (e.g., supporting autonomous radio resource allocation (RRA) that can be used for out-of-coverage sidelink UEs or partial-coverage sidelink UEs).

Cellular vehicle-to-everything (C2VX) protocols enable vehicles to communicate and exchange messages or information with other vehicles, devices, and infrastructure. Vehicles or devices may exchange information such as their location, speed, and direction with each other. In addition, emergency and warning message such as braking alarms, red light warning, emergency braking, tunnel entry warning, and road work cautions, and similar messages may be transmitted. This information is shared on a certain minimum periodic basis and may be used to generate critical alerts to other vehicles, drivers, or devices. When necessary, infrastructure nodes help relay messages to vehicles at longer distances. Vehicles or devices, such as UEs, select their own resources for transmitting autonomously, that is, without direction from a network. The vehicle-to-vehicle communications incorporating autonomous resource selection may use the PC5 interface, which is based on direct long-term evolution (LTE) sidelinks. While the PC5 interface may be used other interfaces, including NR, may also be used. In addition, UEs select transmission resources to satisfy latency, periodicity, and message size requirements.

Communication resources for both transmitting and receiving are allocated in subframes, slots, or transmission time intervals (TTI). Throughout this disclosure, a communication resource may be described as a subframe, slot, or TTI. Transmission scheduling is autonomous and may be semi-persistent scheduling (SPS) or event driven scheduling. Event driven scheduling may be for alarm messages or one time transmissions. The transmission scheduling may be based on CV2X resource sensing procedures performed on received subframes and slots. Sensing procedures may use received signal strength indication (RSSI) measurements for candidate transmission resource detection and may use received signal received power (RSRP) measurements for resource exclusion. Resources may be selected on a two-dimensional frequency versus time map with subchannel grids in the frequency dimension and subframes in the time dimension. Autonomous resource selection refers to the selection of a subframe from the available subframes at a particular location. Although the description of resources is primarily with respect to subframes, other resources, such as slots, are also contemplated. The selection of transmission resources may use an allocation collision detection module 198, described above in connection with FIG. 1. The allocation collision detection module 198 helps to ensure that UEs transmit and receive on vacant resources whenever possible and prevents or minimizes collisions.

A collision is defined as when two or more UEs transmit control information (e.g., a PSCCH) on the same transmission resource, such as a subframe. An overlap is defined as when two or more UEs transmit on the same resource such that control information (e.g., a PSCCH) from one UE overlaps with data (e.g., a PSSCH) from another UE. A collision is illustrated in FIG. 7A, discussed below.

Before a UE transmits, the UE selects resources for the transmission. Ideally, the selected resources are vacant or at least include few or weak transmissions. Autonomous resource selection for transmitting on vacant resources includes power estimation (e.g., based on received signal strength indication (RSSI) measurements) to determine whether a resource is occupied. When determining candidate resources for transmission, a transmitting UE excludes unmeasured subframes due to a UE's previous transmissions, and also excludes resources based on expected conflicts with other UEs.

Aspects of the present disclosure provide for reporting of collisions and overlaps observed in a neighborhood (also referred to as coverage zone) by a UE to help a UE transmitting on the same resources become aware of allocation collisions that may be relevant in determining candidate resources for transmission. A CV2X UE in a reception mode monitors and detects control channels (e.g., physical sidelink control channels (PSCCHs)) transmitted from UEs in its neighborhood (e.g., coverage area). The control channels are detected within each resource, such as a subframe index in the time dimension and the CV2X subchannel in the frequency domain. The receiving UE determines the presence of control channels in each resource by attempting to demodulate and decode control channel hypotheses based on a demodulation reference signal (DMRS) time cyclic shift or DMRS sequence hypothesis testing of received signals. In this blind decoding process many stages are used, one of which is channel estimation based DMRS. The UE may determine whether a calculated cyclic redundancy check (CRC) is the same for a received message as for the transmitted message, e.g., whether CRC passes or fails. A UE may determine whether a received signal corresponds to a control channel by observing peaks in the blindly decoded received signals. Each peak may be considered to be a control channel. Cyclic shift may also be accounted for when detecting control channels.

The strongest cyclic shift and DMRS sequence hypothesis per specific control channel resource may be addressed for control channel decoding on the basis that there is a single control channel allocated on a specific control channel resource. However, when a control channel allocation collision occurs, different colliding allocations may be associated with a different control channel hypothesis, because the DMRS cyclic shift (CS) and DMRS sequence option are randomly selected by the transmitting UEs on each transmission occasion. Each control channel hypothesis may be detected by successful decoding. Successful decoding of more than a single control channel (CCH) hypothesis on the same CCH resource may serve as a basis for collision detection on the addressed resource, or subchannel. The existence of multiple control channel allocations on the same CCH resource, which is an allocation collision, may also be detected even without successfully decoding any of the colliding CCH allocations, based on different CCH hypotheses. This may be performed in the domain of an estimated channel impulse response (CIR) based on the corresponding CIR obtained in one of the cyclic shift ranges in the CIR response for every tested DMRS sequence option. An allocation collision may be determined where the CCH hypothesis energy metric crosses a threshold for several CCH hypotheses on the same CCH resource.

According to aspects of the present disclosure, the UE may calculate a number (or quantity) of detected control channel allocations on the same control channel resource. The number may be based on whether each peak of a received signal is above or below a threshold value. The threshold value may be based on a CIR energy metric. For example, if the UE detects two peaks above the threshold value within a particular subframe, the UE determines two control signals are present in the subframe.

In some aspects of the present disclosure, virtual collisions may also be counted. For example, the UE may read the control channel of received paired hybrid automatic repeat request (HARQ) information to determine linked future transmissions. That is, future transmissions can be determined based on received control channel information. In the case of virtual collisions, the control channel has not yet been received but is expected to occur due to the linking between the HARQ pair.

A virtual PSCCH is a PSCCH that was indicated by an HARQ pair (not via detecting a PSCCH), or via indication of a cyclic shift peak, as described above. The indication can contribute to the confidence of the discovery method as described above, e.g., when the passing of the peak is not significant, or when two colliding PSCCHs randomly selected the same cyclic shift and a single peak is therefore discovered.

A virtual collision, as described elsewhere and shown in FIG. 7A, may occur between a discovered PSCCH and a virtual PSCCH. A virtual collision may also occur between two virtual PSCCHs.

A redundant version 2 (RV2) collision may be expected to occur due to an earlier redundant version zero (RV0) "HARQ pair." The RV0 HARQ pair indicates the location of the expected PSCCH while another PSCCH is detected. Based on the HARQ pair the UE may determine which PSCCHs may be expected to collide on a future transmission. This virtual collision on an RV2 HARQ pair may be avoided by rescheduling of transmit resources.

Figure 7C:
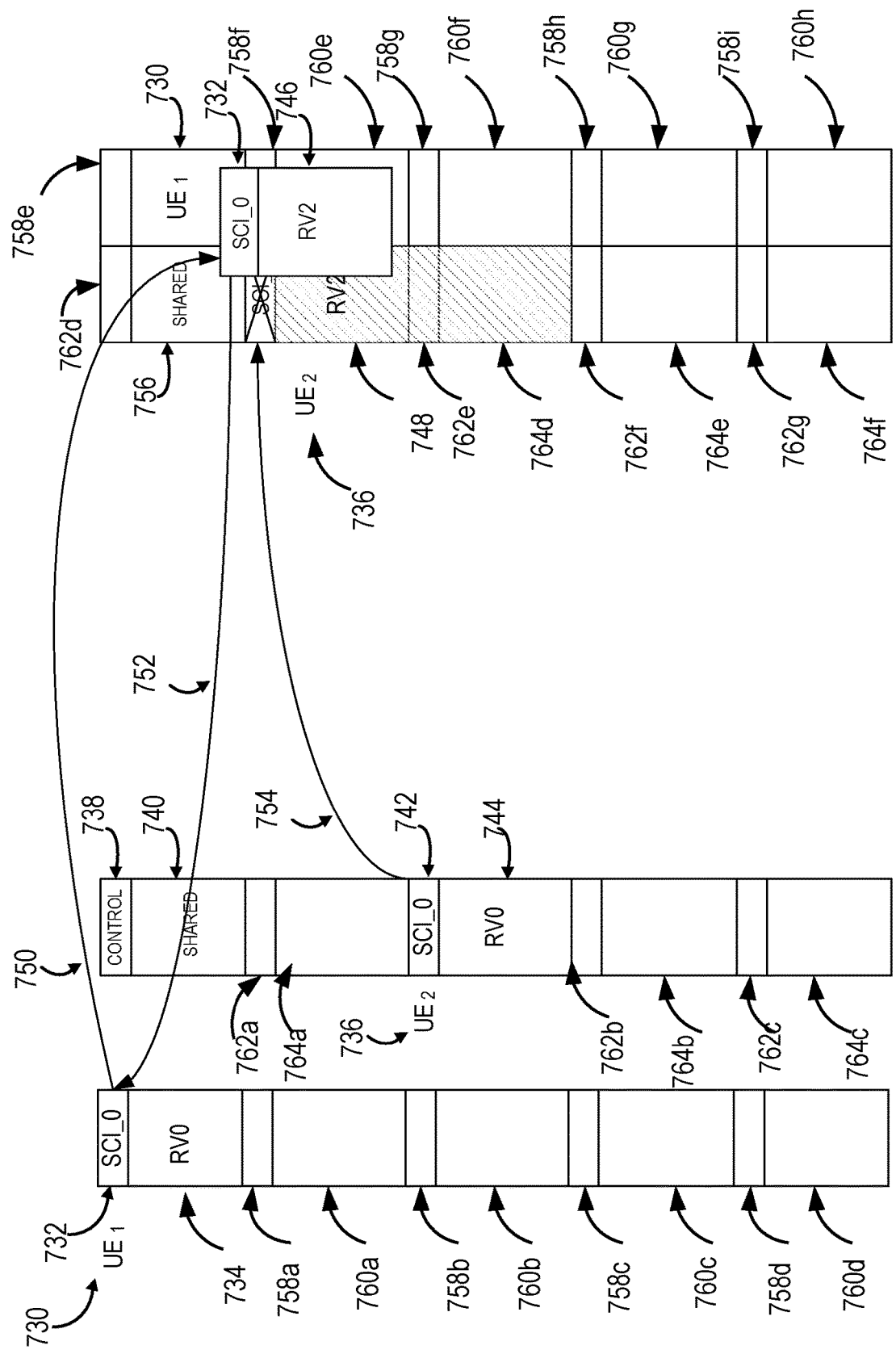
FIG. 7C is a diagram illustrating a virtual collision in a cellular vehicle-to-everything (CV2X) system, in accordance with aspects of the disclosure.

An RV2 HARQ pair may be virtually detected. As shown in FIG. 7C (described below) a virtual collision may occur between two UEs. In virtually detecting an RV2, only one UE's RV2 is processed. As described in more detail below, in FIG. 7C, the RV2 of a first UE is processed and not the RV2 of a second UE.

A UE may also determine whether an overlap occurs. The UE decodes the control channel of a first UE to determine when the shared channel (or other information) of the first UE is scheduled to arrive. The UE blind detects the control channel (PSCCH) allocations prior to searching for data or shared channels (PSSCH). After detection, and avoidance or survival of the control channel collisions, the allocations of the respective shared channels (PSSCH) are analyzed from the PSCCH (e.g., sidelink control information (SCI) fields), and an overlap is detected. The UE may detect signals from a second UE during the period indicated by the control channel to determine if any control channel from the second UE is received in the same period as the scheduled shared channel.

Virtual overlaps may also be determined, similar to virtual collisions. A receiving UE may determine that a virtual overlap will occur when a virtual shared channel of the UE overlaps with a detected control channel. A virtual PSCCH is a PSCCH that was indicated by a hybrid automatic repeat request (HARQ) pair, and not via detecting a PSCCH, or via an indication of the cyclic shift peak. Virtual overlaps may involve one or more virtual PSCCHs.

Collisions and overlaps may be caused by hidden UEs. A UE may be hidden due to coverage. For example, a hidden UE may interfere with a receiver, while being out of range of a transmitter. Thus, the hidden UE is not seen by the transmitting UE. Referring to FIG. 4A, the RSU 410 may transmit data to the UE 404 via a sidelink transmission 412. The UE 402 may interfere with reception by the UE 404 of the data from the RSU 410, but the UE 402 may not be detected by the RSU 410 because the UE 402 is too far from the RSU 410. The UE 402 is 'hidden' from the RSU 410. Hidden UEs will not exclude each other when selecting resources and may therefore send colliding transmissions when a neighboring UE selects the same transmission resource.

In addition, UEs may be hidden due to the half-duplex design of many UEs. In a half-duplex communication system, a transmitting device, such as a UE does not measure the resources used by other UEs on the same subframe. In addition, a UE cannot transmit and receive at the same time. When transmitting, signals from the transmitting UE may collide with other UEs in the same coverage area because a UE cannot receive and detect signals from the other UEs while transmitting. In effect, while transmitting, a UE is deaf to other UEs. Other radio access technologies (RATs), such as wireless local area network (WLAN) may also cause collisions and overlaps. Such collisions and overlaps are detrimental to cellular vehicle-to-everything (CV2X) communication.

Aspects of this disclosure provide methods for reporting collisions and overlaps by a CV2X UE (also referred to as a reporting UE). A receiving UE may be any of the UEs 104, 402, 404, and 406 of FIGS. 1 and 4. According to aspects of the present disclosure, a UE that detects collisions and overlaps may report the collisions and overlaps in a collision report. The transmitting UE may select transmission resources based on the collision report, improving the chances of avoiding collisions or overlaps. In some implementations, a single bit indicates whether an overlap or collision occurs. In other implementations, multiple bits indicate a number of collisions or overlaps occurring. In still other implementations, the bits indicate which subframes include collisions or overlaps. This occurs due to a half-duplex UE transmitting, and therefore being "deaf" to receiving a transmission. It is important to report this as well, to ensure that the resources missed are not deemed vacant. In a frequency domain multiplexing (FDM) system, UEs may transmit at the same time on different frequency resources. Based on the reported collision and overlap information, a transmitting UE may select a transmission resource in accordance with the following precedence: avoiding collisions, avoiding overlaps, and avoiding shared non-overlapping subframes. That is, a UE will first try to avoid collisions and overlaps, but if both exist, the UE will select the resource without collisions. If a resource is available that is free from collisions and overlaps, the UE would still select a resource with non-overlapping subframes.

Figure 6:
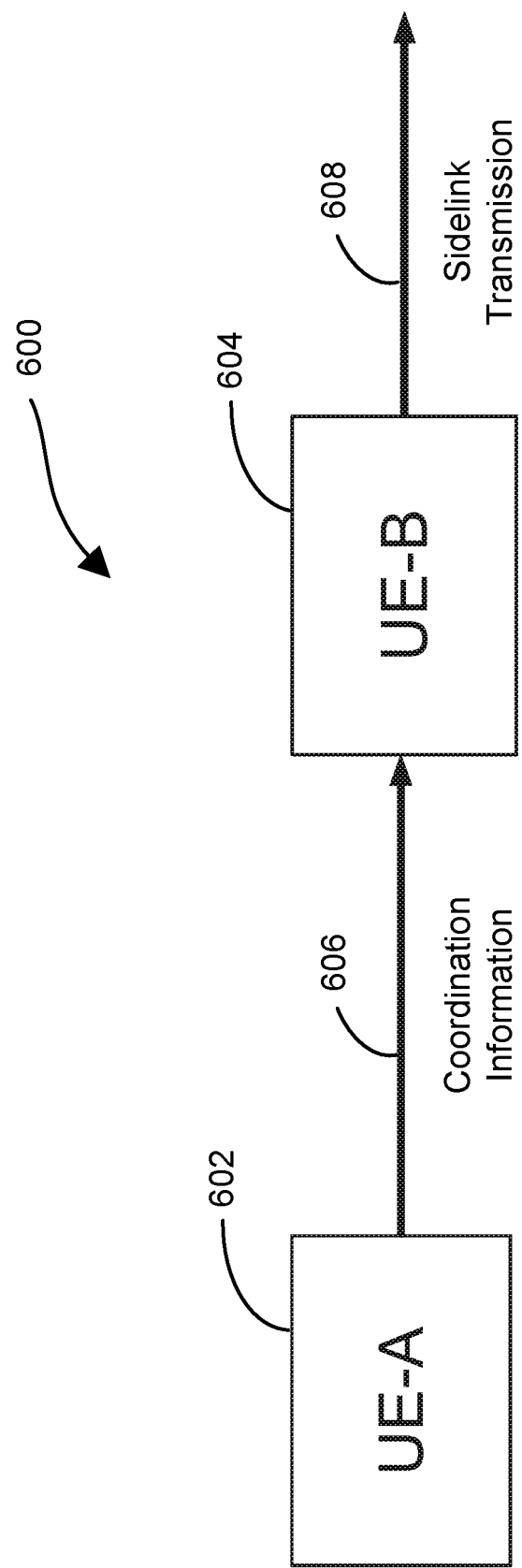
FIG. 6 is a block diagram illustrating inter-user equipment (UE) coordination, in accordance with various aspects of the present disclosure.

FIG. 6 is a block diagram illustrating inter-user equipment (UE) coordination, in accordance with various aspects of the present disclosure. As shown in FIG. 6, a multi-UE group 600 may benefit from inter-UE coordination for improved reliability. The multi-UE group 600 includes UE-A 602 and UE-B 604. A set of resources is determined at UE-A 602. UE-A 602 transmits coordination information 606 to the UE-B 604 based on the set of resources. The coordination information 606 includes the collision and overlap information determined at UE-A 602 for the set of resources. The UE-B 604 uses the coordination information 606, including the collision and overlap information when selecting resources for its own transmission. The UE-B 604 then generates a sidelink transmission 608. The coordination information 606 may improve reliability and reduce packet loss.

FIG. 7A is a diagram illustrating a collision in a cellular vehicle-to-everything (CV2X) system, in accordance with aspects of the disclosure. A collision 700 is illustrated in FIG. 7A by two control channel transmissions on top of one another, in other words, occurring at the same time and frequency allocation. A first UE 1 702 is transmitting at the same time as a second UE 2 704. The sidelink control information (SCI) for the first UE 1 702 is shown as SCI_01 706. The collision occurs when the SCI_01 706 is transmitted at the same or nearly the same time and at the same transmission time interval (TTI), subframe or slot on the same frequency resources as the SCI for the second UE 2 704, shown as SCI_2 712. The shared channel (SCH) for the first UE 1 702 is shown as SCH_1 708 and the shared channel (SCH) for the second UE 2 704 is shown as SCH_2 714. A further SCI for the first UE 1 702 is shown as SCI_03 710.

The SCI for the second UE 2 704 is shown as SCI_2 712 and is shown colliding with the SCI_01 706 from the first UE 1 702. This collision is a fully overlapping collision between the control channel (PSCCH) allocations of UE 1 702 and UE 2 704 and which negatively impacts the sidelink communication between UEs. The control channels (PSCCH) fully collide, while the shared channels (PSSCH) may partially overlap. Because the control channels collide, the entire allocation may be deemed fully overlapped. In a fully overlapping collision in a subchannel and in a time period (e.g., subframe, slot, TTI, or symbols), a control channel from UE 1 702 collides with a control channel from UE 2 704. Control channel (CCH) collisions may be detected using multiple hypothesis decoding of the control channels. For 3GPP Releases 14 and 15 systems, control channel transmission may be performed using a constant demodulation reference signal (DMRS) sequence and with a randomly selected cyclic shift (CS), by each UE, in time for each transmission. This cyclic shift may be randomly selected from several pre-defined cyclic shift options. This cyclic shift selection allows differentiation between colliding CCHs in the time domain (TD) based on an observed channel impulse response (CIR).

A transmission time interval (TTI) is a parameter related to encapsulation of data from higher layers into frames for transmission on the link layer. TTI may also refer to the duration of a transmission on the radio link. In addition, TTI may be related to the size of the data blocks passed from the higher network layers to the link layer. To combat errors due to fading and interference, data may be divided into blocks and then into bits within a block. The bits may then be encoded an interleaved. The length of time to transmit one such block determines the TTI. Throughout this disclosure the terms TTI, slot, or subframe may be used interchangeably.

The cyclic shift may be randomly selected among four values that separate the symbol time range into four non-overlapping subzones. In other words, although the two transmissions arrive in the same symbol, because of the cyclic shift offset, the signals can be distinguished from one another. Thus, a UE may detect the collision between the control channel allocation arriving in a CS range with a maximum CIR tap peak and the control channel arriving in another CS range with a maximum CIR tap peak at a different CIR tap and with a different CIR tap peak. Each CS hypothesis may be represented by the CIR energy metric determined from the corresponding CS CIR response subzone.

In some cases, however, two transmissions may have the same cyclic shift. In these cases, the two control channel transmissions are not orthogonal. As a result, only the strongest signal will be decoded. Thus, some of the colliding control channel allocation may not be decodable if those colliding control channels are transmitted with a DMRS having the same CS configuration. If this occurs, it may not be possible to identify the collision from a single scheduling occurrence, in contrast to when transmissions use different cyclic shifts, enabling identification of the colliding control channels in a single scheduling occurrence.

Aspects of the present disclosure are directed to identifying collisions between control channels, even when colliding control channel transmissions have the same cyclic shift on some of the transmission occurrences, by observing multiple control channel transmission occurrences of the same SPS scheduling. If two control channels collide then the shared channels collide. An overlap between the shared channels may vary because the two colliding control channels may have different shared channel allocations. Every subsequent transmission of the same SPS scheduling may use a different cyclic shift randomly selected by a transmitting UE for each transmission. Thus, the combination of cyclic shifts for colliding control channels varies for each transmission. Because the collisions targeted for identification use SPS, every subsequent scheduling occurrence may provide a new opportunity to detect the collision. After four subsequent transmissions of the same SPS, the probability of detecting a collision is nearly one, as shown in Table 1, below. Increasing the number of trials to detect a collision between two SPS streams increases the probability of detection according to the formula below (applicable to Release 14 and Release 15 CV2X UEs):

$$P_{det}(n) = 1 - (4/16)^n,$$

where n is a number of observation subframes with the same colliding control channel allocations.

The detection time and detection probabilities are shown in Table 1, below for up to four transmission occurrences of the same SPS (also referred to as observation subframes).

TABLE 1

| n | $P_{det}(n)$ | Detection Time |
|---|---|---|
| 1 | 0.75 | SPS_period |
| 2 | 0.9375 | SPS_period*2 |
| 3 | 0.9844 | SPS_period*3 |
| 4 | 0.9961 | SPS_period*4 |

For 3GPP Release 16 and beyond, different orthogonal control channel hypotheses for a control channel may use a combination of different cyclic shifts, as described above and different demodulation reference signal (DMRS) sequences. To detect control channel collisions for Release 16 and beyond, control channel hypotheses based on both cyclic shift and DMRS sequences should be decoded.

In this situation described above, both control channels are assumed to be decodable. A control channel may be decodable even with a negative signal-to-noise ratio (SNR) that is above a sensitivity threshold. If the CCH SNR is below the sensitivity threshold because of an overlap with a strong CCH, then the CIR taps may also be below the value of the interference added to the noise floor. As a result, the taps may not be detectable based on the energy metric. Each allocation in Release 14 and Release 15 may be transmitted using transmissions and retransmissions. Each transmission and retransmission has a corresponding CCH having a resource indication value (RIV) field. The RIV field provides information on the SCH mapping of transmissions and retransmissions. The RIV may be redundant because decoding one of the two CCHs related to the same allocation may also yield the mapping information. Any two of the CCHs may be addressed in general for collision detection, with one CCH providing information for the current SCH and the other providing information for the retransmissions SCH up to fifteen later. The second CCH provides information on the transmissions and retransmissions fifteen subframes earlier. The transmission and retransmission may have a gap of up to fifteen subframes.

FIG. 7B is a diagram illustrating an overlap in a cellular vehicle-to-everything (CV2X) system, in accordance with aspects of the disclosure. An overlap 716 is illustrated in FIG. 7B by the overlap between a control channel and a shared channel in transmissions from two UEs. In FIG. 7B, a second UE 2 720 transmits a control channel SCI_2 726 that overlaps with a shared channel SCH_1 724 transmitted by a first UE 1 718.

A shared channel transmission may be performed with a demodulation reference signal (DMRS) different from the control channel DMRS, and thus collision detection between the control channel and the shared channel is different. The shared channel to control channel collision may be identified by decoding sidelink control information fields from both conflicting transmissions. Based on the sidelink control information, the UE may determine where a shared channel is expected. For example, the UE may build a mapping of the corresponding shared channel locations known from the resource indication value (RIV) fields of the corresponding decoded sidelink control information.

FIG. 7C is a diagram illustrating a virtual collision in a cellular vehicle-to-everything (CV2X) system, in accordance with aspects of the disclosure. In FIG. 7C a virtual collision and overlap scenario is shown. A UE 1 730 has SCI_0 732, RV0 734, RV 2 746, and shared channel 756.

The UE 1 730 also has additional SCI channels 758*a-i* and additional shared channels 760*a-h*. A UE 2 736 has control channel 738 and shared channel 740, as well as SCI_0 742, RV0 744 and RV 2 748. The UE 2 736 also has additional SCI channels 762*a-f* and additional shared channels 764*a-f*. A virtual collision 750 is shown on SCI_0 732 of UE 1 730 colliding with SCI_0 742 of UE 2 736. A virtual overlap 752 is shown on RV2 746 of UE 1 730 and RV2 748 of UE 2 736. An additional virtual collision 754 is shown on SCI_0 742 of UE 2 736 and SCI_0 732 of UE 1 732.

According to aspects of the disclosure, a UE may report overlaps and/or collisions to other UEs. Multiple reporting options are available. For example, a UE with a scheduled unicast transmission may report the collision and/or overlap in a shared channel, such as a PSSCH. In some examples, the information may be reported as a number of bits, M, within uplink control information (UCI) bits in the PSSCH.

For UEs allocated with a feedback channel, such as a channel for acknowledgement/negative acknowledgement (ACK/NACK), the collision and/or overlap information may be multiplexed with ACK/NACK bits. This may occur when a unicast connection or a connection oriented groupcast connection exists with at least one of the UE. In this option, the ACK channel may be enhanced with a number of reporting bits, M. In one type of enhancement, the number of bits within the ACK channel are increased. For example, M bits of the report may be multiplexed with the ACK bit. In another enhancement, the reporting UE increases (e.g., duplicates) the number of ACK channels. The increase may be in accordance with an ACK channel capacity. For example, each UE can have two adjacent ACK channels. The first channel can be for ACK, the second channel can be for reporting information. Other enhancements are also contemplated.

Additional reporting options are available for UEs that are not allocated with an ACK feedback channel. These options may be used when the connection is a connectionless groupcast or a broadcast connection. In a first reporting method, M bits of the collision and overlap report are multiplexed with channel state information (CSI) bits in a feedback channel. In another option, an additional CSI channel may be provided. In still another aspect, the bits may be multiplexed with channel occupancy information (COI) bits, instead of CSI bits.

Once all collisions and overlaps, both actual and virtual, are identified, the UE can report the information to the transmitting UE, using the coordination information 606 transmission shown in FIG. 6. As described above, the reports shared between UEs may include feedback bits to support collision and overlap occurrence. The feedback bits may also be used to identify same subframe occurrences. Information on same subframe occurrences may include a number of overlapped subchannels, an interference level, and other metrics.

Based on the reports, a transmitting UE may reselect a transmission resource according to a precedence order. This precedence order may prioritize first avoiding collisions, second avoiding overlaps, and third, avoiding non-overlapping information that is sharing a same subframe or slot. When the same subframe or slot is shared, the transmitting frequencies used by the sharing UEs may be different. In other words, frequency division multiplexing may be employed.

Based on the reports received, a transmitting UE may select or reselect a transmit channel according to the collision and overlap information. Reselection may include dropping an existing semi-persistent schedule (SPS) and beginning a new SPS. For example, if 100 transmissions are semi-persistently scheduled, but a collision is reported for the third transmission, the UE may select a different SPS that is no longer colliding or overlapping for the remaining 97 transmissions. The UE may reselect to a new transmission resource with no collisions by selecting another subframe or slot with no collision. If this is not possible, then the same subframe or slot may be selected if there is no overlap. If this is also not possible, then the UE selects the subframe or slot with as small an overlap as is possible. That is, while both collisions and overlaps cause transmission interference, the selection of new transmission resources may include selecting a new resource with a lower degree of partial overlap. A collision between control channels may indicate a loss of control channel and loss of the corresponding data, as a UE decodes a single control channel. An overlap may indicate interference and a reduction in signal conditions with a higher probability of failure.

The UE is free to reselect any new resource in another time period, as long as there is no overlap or collision. In such a case, the UE can select for non-overlapped reception when the signal cannot be received by the transmitting UE. A UE may reselect a vacant resource, that is, a resource with neither a collision or overlap for transmission. However, in such situations, another reception in the same symbol may occur, for example, when frequency division multiplexing occurs.

As indicated above FIGS. 6, 7A, 7B, and 7C are provided as examples. Other examples may differ from what is described with respect to FIGS. 6, 7A, and 7B.

Figure 8:
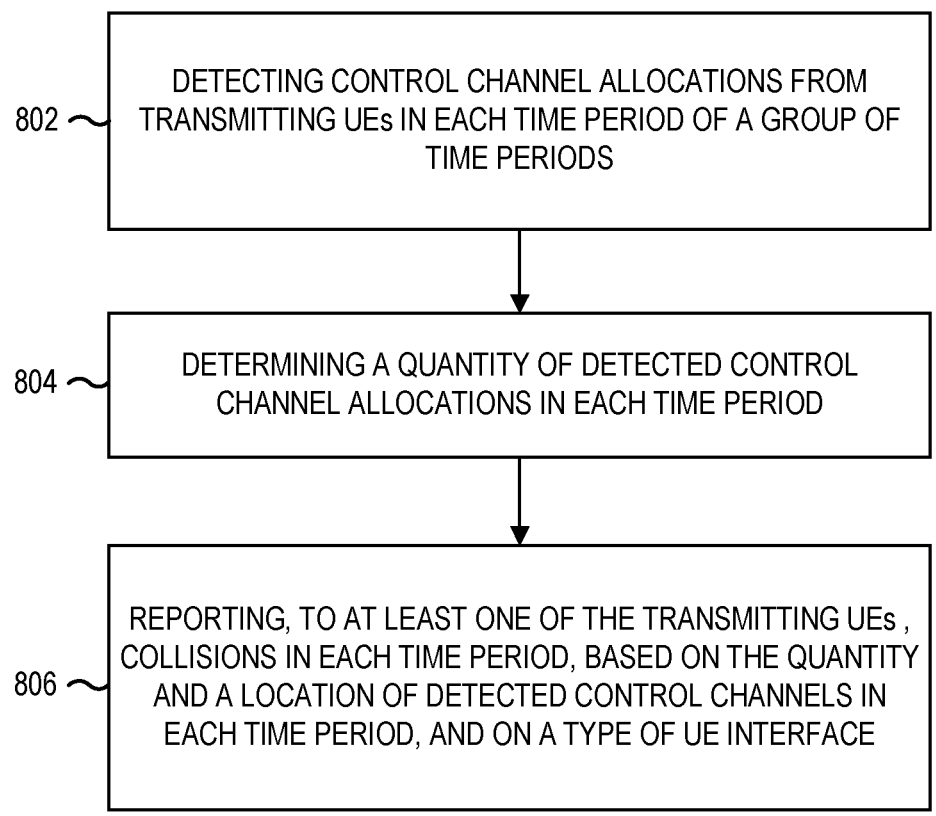
FIG. 8 is a flow diagram of collision and overlap detection by a sidelink receiving user equipment (UE), in accordance with aspects of the disclosure.

FIG. 8 is a flow diagram of collision and overlap detection by a sidelink user equipment (UE), in accordance with aspects of the disclosure. The flow diagram 800 illustrates collision and overlap reporting. The flow diagram begins with detecting control channel allocations from a plurality of transmitting UEs in each time period of a plurality of time periods in block 802. Multiple control channels may be detected. Next, in block 804, the method continues with determining a quantity of detected control channel allocations in each time period. Then, in block 806, the method continues with reporting, to at least one of the plurality of transmitting UEs, collisions in each time period, based on the quantity and a location of detected control channels in each time period, and on a type of UE interface. As shown in FIG. 6, the UE-B 604 may report the collisions and overlaps in a sidelink transmission 608.

Figure 9:
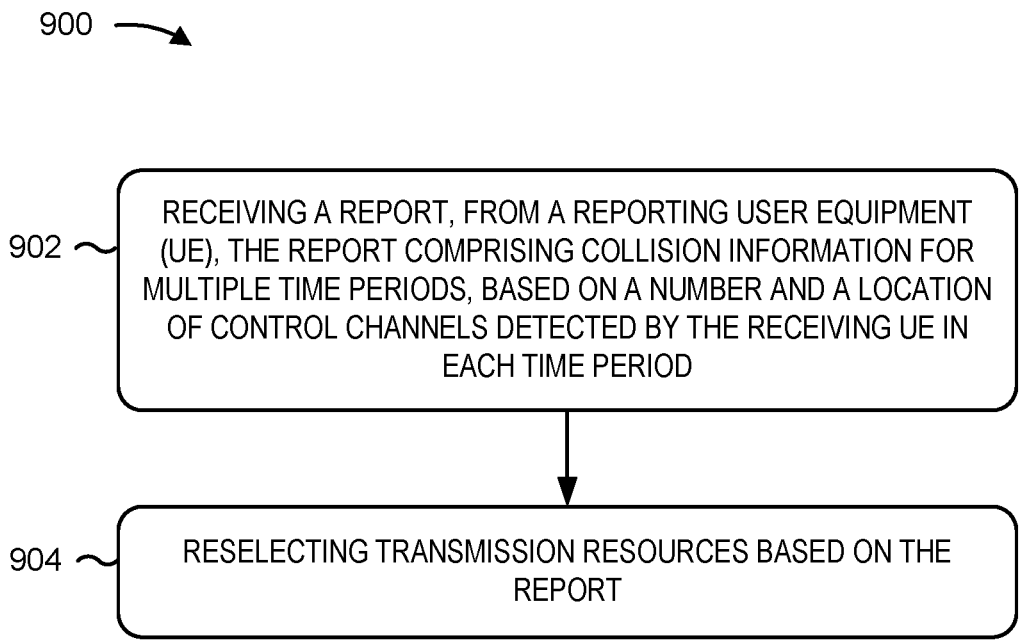
FIG. 9 is a flow diagram of a method of wireless communication by a sidelink transmitting user equipment (UE), in accordance with aspects of the disclosure.

FIG. 9 is a flow diagram of a method 900 of wireless communication for a sidelink transmitting user equipment (UE), in accordance with aspects of the disclosure. The method 900 provides for selecting and reselecting transmission resources. The method 900 begins in block 902, with receiving a report, from a reporting user equipment (UE). The report includes collision information for multiple time periods, based on a number and a location of control channels detected by the receiving UE in each time period. The report includes collision, overlap and frequency domain multiplexing (FDM) information for multiple time periods, based on a number and a location of control channels detected by the reporting UE in each time period. The reporting UE may be one of the UEs 104, 402, 404, and 406 of FIGS. 1 and 4. The method continues in block 904, with reselecting transmission resources based on the report.

Implementation examples are described in the following numbered clauses.

1. A method of wireless communication by a sidelink user equipment (UE), comprising:

detecting control channel allocations from a plurality of transmitting UEs in each time period of a plurality of time periods;

determining a quantity of detected control channel allocations in each time period; and reporting, to at least one of the plurality of transmitting UEs, collisions in each time period, based on the quantity and a location of detected control channels in each time period, and on a type of UE interface.

2. The method of clause 1, further comprising reporting overlaps and virtual overlaps in each time period, based on the quantity and the location of detected control channels in each time period.

3. The method of any of the preceding clauses, further comprising:

determining a quantity of virtual collisions and virtual overlaps based on decoding the control channels and hybrid automatic repeat request (HARQ) bits; and reporting virtual collisions and virtual overlaps in each time period, based on the quantity of virtual collisions and the location of detected control channels in each time period.

4. The method of any of the preceding clauses, further comprising reporting a quantity of collisions and virtual collisions, a quantity of overlaps and virtual overlaps, a same subframe occurrence, a number of overlapped subchannels, and/or an interference level using reporting bits multiplexed with an acknowledgement (ACK) bit or duplicate acknowledgement (ACK) channels.

5. The method of any of the preceding clauses, in which reporting collisions, virtual collisions, overlaps and virtual overlaps occurs via control bits within a physical shared channel when a unicast connection exists with the at least one of the plurality of transmitting UEs.

6. The method of any of the preceding clauses, in which reporting comprises multiplexing collision information with ACK/NACK (acknowledgment/negative acknowledgment) bits when a unicast connection or connection oriented groupcast connection exists with the at least one of the plurality of transmitting UEs.

7. The method of any of the preceding clauses, in which reporting occurs via an additional ACK/NACK (acknowledgment/negative acknowledgment) channel when a unicast connection or connection oriented groupcast connection exists with the at least one of the plurality of transmitting UEs.

8. The method of any of the preceding clauses, in which reporting comprises multiplexing collision information with channel state information (CSI) bits when the control channels are broadcast or detected via connectionless groupcast from the plurality of transmitting UEs.

9. The method of any of the preceding clauses, in which reporting occurs via an additional channel state information (CSI) channel when the control channels are broadcast or detected via connectionless groupcast from the plurality of transmitting UEs.

10. A method of wireless communication for a sidelink transmitting user equipment (UE), comprising:

receiving a report, from a reporting UE, the report comprising collision information and virtual collision information for a plurality of time periods, based on a quantity and a location of control channels detected by the receiving UE in each time period; and reselecting transmission resources based on the report.

11. The method of clause 10, further comprising prioritizing resources for reselecting in the following order from lowest priority to highest priority:

colliding resources, overlapping resources, and non-overlapping resources.

12. The method of any of the preceding clauses, further comprising prioritizing overlapping resources with a higher priority assigned to a smaller amount of overlap.

13. An apparatus for wireless communication by a sidelink user equipment (UE), comprising:

a collision detection module configured to communicate with a UE, an infrastructure element, and a network;

a memory; and at least one processor coupled to the memory and configured:

to detect control channels from a plurality of transmitting UEs in each time period of a plurality of time periods;

to determine a quantity of detected control channels in each time period; and to report, to at least one of the plurality of transmitting UEs, collisions in each time period, based on the quantity and a location of detected control channels in each time period, and on a type of UE interface.

14. The apparatus of clause 13, in which the at least one processor is further configured to report overlaps in each time period, based on the quantity and the location of detected control channels in each time period.

15. The apparatus of any of the preceding clauses, in which the at least one processor is further configured:

to determine a quantity of virtual collisions based on decoding the control channels; and to report virtual collisions in each time period, based on the quantity of virtual collisions and a location of detected control channels in each time period.

16. The apparatus of the preceding clauses, in which the at least one processor is further configured to report a quantity of collisions, a number of overlaps, a same subframe occurrence, a number of overlapped subchannels, and/or an interference level.

17. The apparatus of any of the preceding clauses, in which the at least one processor is further configured to report via control bits within a physical shared channel when a unicast connection exists with the at least one of the plurality of transmitting UEs.

18. The apparatus of any of the preceding clauses, in which the at least one processor is further configured to multiplex collision information with ACK/NACK (acknowledgement/negative acknowledgement) bits when a unicast connection or connection oriented groupcast connection exists with the at least one of the plurality of transmitting UEs.

19. The apparatus of any of the preceding clauses, in which the at least one processor is further configured to report via an additional ACK/NACK (acknowledgement/negative acknowledgement) channel when a unicast connection or connection oriented groupcast connection exists with the at least one of the plurality of transmitting UEs.

20. The apparatus of any of the preceding clauses, in which the at least one processor is further configured to report by multiplexing collision information with channel state information (CSI) bits when the control channels are broadcast or detected via connectionless groupcast from the plurality of transmitting UEs.

21. The apparatus of any of the preceding clauses, in which the at least one processor is further configured to report via an additional channel state information (CSI)

channel when the control channels are broadcast or detected via connectionless groupcast from the plurality of transmitting UEs.

22. The apparatus of any of the preceding clauses, in which the at least one processor is further configured:

to receive a report, from a reporting UE, the report comprising collision information for a plurality of time periods, based on a number and a location of control channels detected by the reporting UE in each time period; and to reselect transmission resources based on the report.

23. The apparatus of any of the preceding clauses, in which the at least one processor is further configured to prioritize resources for reselecting in the following order from lowest priority to highest priority: colliding resources, overlapping resources, and non-overlapping resources.

24. The apparatus of any of the preceding clauses, in which the at least one processor is further configured to prioritize overlapping resources with a higher priority assigned to a smaller amount of overlap.

25. An apparatus for wireless communication, by a sidelink user equipment (UE), comprising:

a memory; and at least one processor coupled to the memory and configured:

to detect control channel allocations from a plurality of transmitting UEs in each time period of a plurality of time periods;

to determine a quantity of detected control channel allocations in each time period; and to report, to at least one of the plurality of transmitting UEs, collisions in each time period, based on the quantity and the location of detected control channels in each time period and on a type of UE interface.

26. The apparatus of clause 25, in which the at least one processor is further configured:

to report overlaps and virtual overlaps in each time period, based on the quantity and the location of detected control channels in each time period.

27. The apparatus of any of the preceding clauses, in which the at least one processor is further configured:

to determine a quantity of virtual collisions and virtual overlaps, based on decoding the control channels and hybrid automatic repeat request (HARQ) bits; and to report virtual collisions and virtual overlaps in each time period, based on the quantity of virtual collisions and the location of detected control channels in each time period.

28. The apparatus of any of the preceding clauses, in which the at least one processor is further configured:

to report a quantity of collisions and virtual collisions, a quantity of overlaps and virtual overlaps, a same subframe occurrence, a number of overlapped subchannels, and/or and interference level using reporting bits multiplexed with an acknowledgement (ACK) bit or duplicate acknowledgement (ACK) channels.

29. The apparatus of any of the preceding clauses, in which the at least one processor is further configured:

to report collisions by multiplexing collision information with ACK/NACK (acknowledgement/negative acknowledgement) bits when a unicast connection or connection oriented groupcast connection exists with the at least one of the plurality of transmitting UEs.

30. The apparatus of any of the preceding clauses, in which the at least one processor is further configured:

to report collisions, virtual collisions, overlaps, and virtual overlaps via control bits within a physical shared channel when a unicast connection exists with the at least one of the plurality of transmitting UEs.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a sidelink user equipment (UE), comprising:

detecting control channel allocations from a plurality of transmitting UEs in each time period of a plurality of time periods;

determining a quantity of detected control channel allocations in each time period;
determining virtual control channels comprising linked future transmissions;
determining a quantity of virtual collisions based on the virtual control channels;
reporting, to at least one of the plurality of transmitting UEs, virtual collisions in each time period, based on the quantity of virtual collisions; and
reporting, to at least one of the plurality of transmitting UEs, control channel collisions in each time period, based on the quantity and location of detected control channels in each time period, the reporting the control channel collisions occurring via an additional ACK/NACK (acknowledgment/negative acknowledgment) channel when a unicast connection or connection oriented groupcast connection exists with the at least one of the plurality of transmitting UEs, and the reporting the control channel collisions comprises either multiplexing collision information with channel state information (CSI) bits or transmitting an additional CSI channel when the control channels are broadcast or detected via connectionless groupcast from the plurality of transmitting UEs.

2. The method of claim 1, further comprising reporting overlaps and virtual overlaps in each time period, based on the quantity and the location of detected control channels in each time period.

3. The method of claim 1, further comprising:
determining a quantity of virtual collisions and virtual overlaps based on decoding the control channels and hybrid automatic repeat request (HARQ) bits; and
reporting the virtual overlaps in each time period, based on the quantity of virtual overlaps and the location of detected control channels in each time period.

4. The method of claim 1, further comprising reporting a quantity of collisions and virtual collisions, a quantity of overlaps and virtual overlaps, a same subframe occurrence, a number of overlapped subchannels, and/or an interference level using reporting bits multiplexed with an acknowledgement (ACK) bit or duplicate acknowledgement (ACK) channels.

5. A method of wireless communication for a sidelink transmitting user equipment (UE), comprising:
receiving a report, from a reporting UE, the report comprising collision information and virtual collision information for a plurality of time periods, based on a quantity and a location of control channels detected by the reporting UE in each time period and virtual control channels comprising linked future transmissions, the report received via an additional ACK/NACK (acknowledgment/negative acknowledgment) channel when a unicast connection or connection oriented groupcast connection exists with the reporting UE, and the report is received as either collision information multiplexed with channel state information (CSI) bits or an additional CSI channel when the control channels are broadcast or detected via connectionless groupcast from the reporting UE; and
reselecting transmission resources based on the report.

6. The method of claim 5, further comprising prioritizing resources for reselecting in the following order from lowest priority to highest priority: colliding resources, overlapping resources, and non-overlapping resources.

7. The method of claim 6, further comprising prioritizing overlapping resources with a higher priority assigned to a smaller amount of overlap.

8. An apparatus for wireless communication by a sidelink user equipment (UE), comprising:
a collision detection module configured to communicate with a UE, an infrastructure element, and a network;
a memory; and
at least one processor coupled to the memory and configured:
to detect control channels from a plurality of transmitting UEs in each time period of a plurality of time periods;
to determine a quantity of detected control channels in each time period;
to determine virtual control channels comprising linked future transmissions;
to determine a quantity of virtual collisions based on the virtual control channels;
to report, to at least one of the plurality of transmitting UEs, virtual collisions in each time period, based on the quantity of virtual collisions; and
to report, to at least one of the plurality of transmitting UEs, control channel collisions in each time period, based on the quantity and location of detected control channels in each time period, the reporting the control channel collisions occurring via an additional ACK/NACK (acknowledgment/negative acknowledgment) channel when a unicast connection or connection oriented groupcast connection exists with the at least one of the plurality of transmitting UEs, and the reporting the control channel collisions comprises either multiplexing collision information with channel state information (CSI) bits or transmitting an additional CSI channel when the control channels are broadcast or detected via connectionless groupcast from the plurality of transmitting UEs.

9. The apparatus of claim 8, in which the at least one processor is further configured to report overlaps in each time period, based on the quantity and the location of detected control channels in each time period.

10. The apparatus of claim 8, in which the at least one processor is further configured:
to determine a quantity of virtual collisions and virtual overlaps based on decoding the control channels; and
to report the virtual overlaps in each time period, based on the quantity of virtual overlaps and a location of detected control channels in each time period.

11. The apparatus of claim 8, in which the at least one processor is further configured to report a quantity of collisions, a number of overlaps, a same subframe occurrence, a number of overlapped subchannels, and/or an interference level.

12. The apparatus of claim 8, in which the at least one processor is further configured:
to receive a report, from a reporting UE, the report comprising collision information for a plurality of time periods, based on a number and a location of control channels detected by the reporting UE in each time period; and
to reselect transmission resources based on the report.

13. The apparatus of claim 12, in which the at least one processor is further configured to prioritize resources for reselecting in the following order from lowest priority to highest priority: colliding resources, overlapping resources, and non-overlapping resources.

14. The apparatus of claim 13, in which the at least one processor is further configured to prioritize overlapping resources with a higher priority assigned to a smaller amount of overlap.

15. An apparatus for wireless communication, by a sidelink user equipment (UE), comprising:
a memory; and
at least one processor coupled to the memory and configured:
to detect control channel allocations from a plurality of transmitting UEs in each time period of a plurality of time periods;
to determine a quantity of detected control channel allocations in each time period;
to determine virtual control channels comprising linked future transmissions;
to determine a quantity of virtual collisions based on the virtual control channels;
to report, to at least one of the plurality of transmitting UEs, virtual collisions in each time period, based on the quantity of virtual collisions; and
to report, to at least one of the plurality of transmitting UEs, control channel collisions in each time period, based on the quantity and location of detected control channels in each time period, the reporting the control channel collisions occurring via an additional ACK/NACK (acknowledgment/negative acknowledgment) channel when a unicast connection or connection oriented groupcast connection exists with the at least one of the plurality of transmitting UEs, and the reporting the control channel collisions comprises either multiplexing collision information with channel state information (CSI) bits or transmitting an additional CSI channel when the control channels are broadcast or detected via connectionless groupcast from the plurality of transmitting UEs.

16. The apparatus of claim 15, in which the at least one processor is further configured:
to report overlaps and virtual overlaps in each time period, based on the quantity and the location of detected control channels in each time period.

17. The apparatus of claim 15, in which the at least one processor is further configured:
to determine a quantity of virtual collisions and virtual overlaps, based on decoding the control channels and hybrid automatic repeat request (HARQ) bits; and
to report the virtual overlaps in each time period, based on the quantity of virtual overlaps and the location of detected control channels in each time period.

18. The apparatus of claim 15, in which the at least one processor is further configured to report a quantity of collisions and virtual collisions, a quantity of overlaps and virtual overlaps, a same subframe occurrence, a number of overlapped subchannels, and/or and interference level using reporting bits multiplexed with an acknowledgement (ACK) bit or duplicate acknowledgement (ACK) channels.

* * * * *